(12) United States Patent
Shu

(10) Patent No.: US 11,532,063 B2
(45) Date of Patent: Dec. 20, 2022

(54) SYSTEMS AND METHODS FOR ONLINE TO OFFLINE SERVICE

(71) Applicant: BEIJING DIDI INFINITY TECHNOLOGY AND DEVELOPMENT CO., LTD., Beijing (CN)

(72) Inventor: Weihuan Shu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 314 days.

(21) Appl. No.: 16/843,932

(22) Filed: Apr. 9, 2020

(65) Prior Publication Data

US 2020/0234391 A1   Jul. 23, 2020

Related U.S. Application Data

(63) Continuation of application No. PCT/CN2018/094261, filed on Jul. 3, 2018.

(30) Foreign Application Priority Data

Oct. 20, 2017   (CN) .......................... 201710984405.7

(51) Int. Cl.
*G06Q 50/30*   (2012.01)
*G01C 21/34*   (2006.01)
(Continued)

(52) U.S. Cl.
CPC ......... *G06Q 50/30* (2013.01); *G01C 21/3438* (2013.01); *G01S 19/426* (2013.01); *H04W 4/029* (2018.02)

(58) Field of Classification Search
CPC ... G06Q 50/30; H04W 4/029; G01C 21/3438; G01S 19/426
(Continued)

(56) References Cited

U.S. PATENT DOCUMENTS

2011/0099040 A1   4/2011   Felt et al.
2015/0350413 A1   12/2015   Ma et al.
(Continued)

FOREIGN PATENT DOCUMENTS

CN   202362930 U   8/2012
CN   104061934 A   9/2014
(Continued)

OTHER PUBLICATIONS

"Autonomous vehicle public transportation system" Published by IEEE (Year: 2014).*
(Continued)

*Primary Examiner* — Zeina Elchanti
(74) *Attorney, Agent, or Firm* — Metis IP LLC

(57) ABSTRACT

The present disclosure relates to a system and method for operating an online to offline service platform. The system may perform the methods to: receive a service order from a first terminal associated with a passenger, the service order including a first identifier corresponding to the passenger and a pick-up location designated by the passenger; determine a second identifier corresponding to a driver accepting the service order; obtain first status corresponding to the first identifier; generate, based on the first status, a first instruction; and send the first instruction to a second terminal associated with the second identifier.

20 Claims, 10 Drawing Sheets

(51) Int. Cl.
*H04W 4/029* (2018.01)
*G01S 19/42* (2010.01)

(58) Field of Classification Search
USPC .......................................................... 705/13
See application file for complete search history.

(56) References Cited

U.S. PATENT DOCUMENTS

| | | | | |
|---|---|---|---|---|
| 2015/0369612 | A1* | 12/2015 | Nishimura | G01C 21/3484 |
| | | | | 701/537 |
| 2016/0334232 | A1* | 11/2016 | Zhuang | G01C 21/3438 |
| 2016/0360352 | A1* | 12/2016 | Khan | H04W 4/80 |
| 2017/0229045 | A1* | 8/2017 | Mukaiyama | G01S 19/14 |
| 2019/0385265 | A1* | 12/2019 | Liu | H04W 4/029 |
| 2021/0223051 | A1* | 7/2021 | Hochberg | G06Q 10/0631 |

FOREIGN PATENT DOCUMENTS

| | | |
|---|---|---|
| CN | 104915839 A | 9/2015 |
| CN | 105967708 A | 10/2016 |
| CN | 106296058 A | 1/2017 |
| CN | 106507306 A | 3/2017 |
| CN | 106713444 A | 5/2017 |
| CN | 106792515 A | 5/2017 |
| JP | 2005250614 A | 9/2005 |
| JP | 5140027 B2 | 2/2013 |
| TW | 201314591 A | 4/2013 |
| TW | I704508 B | 9/2020 |

OTHER PUBLICATIONS

International Search Report in PCTICN2018/094261 dated Sep. 28, 2018, 4 pages.
Written Opinion in PCT/CN2018/094261 dated Sep. 28, 2018, 4 pages.
First Office Action in Chinese Application No. 201710984405.7 dated Apr. 2, 2020, 22 pages.

* cited by examiner

SYSTEMS AND METHODS FOR ONLINE TO OFFLINE SERVICE

CROSS-REFERENCE TO RELATED APPLICATIONS

This application is a continuation of International Application No. PCT/CN2018/094261, filed on Jul. 3, 2018, which claims priority of Chinese Application No. 201710984405.7 filed on Oct. 20, 2017, the contents of each of which are incorporated herein by reference.

TECHNICAL FIELD

The present disclosure generally relates to systems and methods for online to offline services, and in particular, systems and methods for transportation service.

BACKGROUND

Internet-based online to offline services, such as online taxi-calling services, have become increasingly popular because of their convenience. With the development of science and technology, in order to save time, people are used to send a service request using a taxi-hailing application installed in their mobile terminals in advance. Usually, after a potential passenger sends the request, a driver can respond to the request through a taxi-hailing application installed in his or her mobile terminal. However, because a current location where the passenger sends the request may be indoor, such as an office, a home, or a shopping mall, the driver may not easily find the passenger when he arrives near a pick-up location. If the driver does not see the passenger and know the location status associated with the passenger, the driver needs to call the passenger to confirm the passenger's status, which would a waste of time and generate unnecessary fees. Therefore, it would be desirable to provide systems and methods to provide such status associated with a user.

SUMMARY

According to a first aspect of the present disclosure, a system is provided. The system may include at least one storage media and at least one processor configured to communicate with the at least one storage media. The at least one storage media may store a set of instructions for operating an online to offline service platform. When executing the set of instructions, the at least one processor may be directed to perform one or more of the following operations. The at least one processor may receive a service order from a first terminal associated with a passenger. The service order may include a first identifier corresponding to the passenger and a pick-up location designated by the passenger. The at least one processor may determine a second identifier corresponding to a driver accepting the service order. The at least one processor may obtain first status corresponding to the first identifier. The at least one processor may generate, based on the first status, a first instruction. The at least one processor may send the first instruction to a second terminal associated with the second identifier.

In some embodiments, to obtain the first status, the at least one processor may obtain a GPS location of the first terminal. The at least one processor may generate the first instruction, based on the first status, including the GPS location.

In some embodiments, if the GPS location shows the first terminal arrives at the pick-up location, the at least one processor may generate the first instruction with a first arrival indication. If the GPS location shows the first terminal does not arrive at the pick-up location, the at least one processor may generate the first instruction including a distance between the GPS location of the first terminal and the pick-up location.

In some embodiments, to obtain the first status, the at least one processor may obtain sensor data of the first terminal if the GPS location is unavailable. The at least one processor may determine the first status based on the sensor data including whether the passenger is moving.

In some embodiments, the at least one processor may further determine whether a GPS switch is turned on if the first terminal is immobile. The at least one processor may generate the first instruction indicating that the passenger does not depart in response to a determination that the GPS switch is turned on.

In some embodiments, the at least one processor may further determine whether a GPS switch is turned on. In response to a determination that the GPS switch is turned off, the at least one processor may further determine a travel time for the passenger to arrive at an exit of a building associated with the service order based on one or more historical orders associated with the building. The at least one processor may further generate, based on the sensor information, a Pedestrian Dead Reckoning (PDR) track.

In some embodiments, the at least one processor may further determine whether the passenger arrives at the exit of the building based on the travel time and the PDR track. The at least one processor may further generate the first instruction with a second arrival indication in response to the determining that the passenger arrives at the exit of the building.

In some embodiments, the one or more historical orders may be associated with a multiple of customers.

In some embodiments, the at least one processor may further receive a sending request from the first terminal. The sending request may include a second status associated with the passenger. The second status may include at least one of clothing data corresponding to the first identifier. The location may correspond to the first identifier. The first status may correspond to the first identifier. The at least one processor may further send the sending request to the second terminal.

According to yet another aspect of the present disclosure, a method is provided. The method may be implemented on at least one device each of which has at least one processor, a storage, and a communication platform to connect to a network. The method may include one or more of the following operations. The at least one processor may receive a service order from a first terminal associated with a passenger. The service order may include a first identifier corresponding to the passenger and a pick-up location designated by the passenger. The at least one processor may determine a second identifier corresponding to a driver accepting the service order. The at least one processor may obtain first status corresponding to the first identifier. The at least one processor may generate, based on the first status, a first instruction. The at least one processor may send the first instruction to a second terminal associated with the second identifier.

According to yet another aspect of the present disclosure, a non-transitory computer readable medium may comprise at least one set of instructions for providing an online to offline service. The at least one set of instructions may executed by at least one processor. The at least one processor may receive a service order from a first terminal associated with a passenger. The service order may include a first identifier corresponding to the passenger and a pick-up location designated by the passenger. The at least one processor may determine a second identifier corresponding to a driver accepting the service order. The at least one processor may obtain first status corresponding to the first identifier. The at least one processor may generate, based on the first status, a first instruction. The at least one processor may send the first instruction to a second terminal associated with the second identifier.

According to yet another aspect of the present disclosure, a system is provided. The system may have at least one processor and storage. The system may include a receiving module configured to receive a service order from a first terminal associated with a passenger. The service order may include a first identifier corresponding to the passenger and a pick-up location designated by the passenger. The system may include an obtaining module configured to obtain first status corresponding to the first identifier. The system may include a determining module configured to determine a second identifier corresponding to a driver accepting the service order. The system may include a generating module configured to generate, based on the first status, a first instruction. The system may include a sending module configured to send the first instruction to a second terminal associated with the second identifier.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAIL DESCRIPTION

Figure 1:
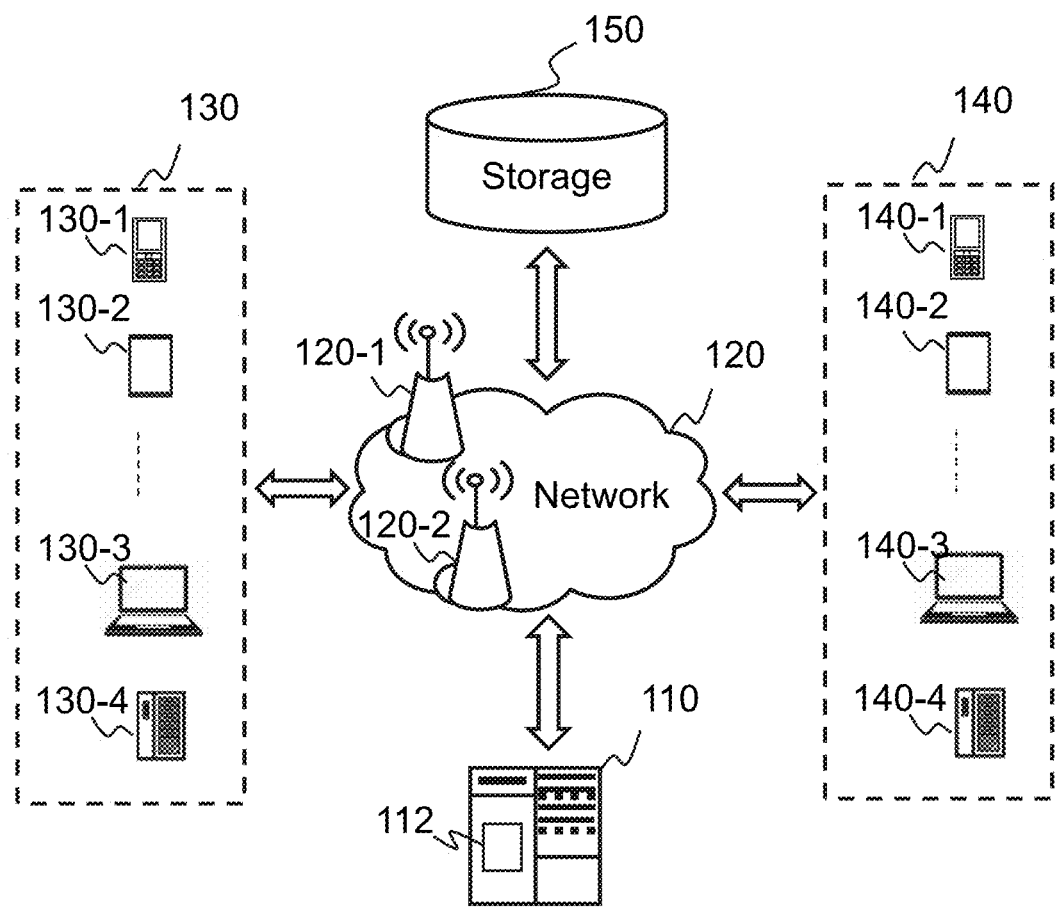
FIG. 1 is a schematic diagram of an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to process a query, it should also be understood that this is only one exemplary embodiment. The system or method of the present disclosure may be applied to any other kind of search service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity that may request or order a service. Also, the term "driver," "provider," "service provider," and "supplier" in the present disclosure are used interchangeably to refer to an individual, entity or a tool that may provide a service or facilitate the providing of the service. The term "user" in the present disclosure may refer to an individual, an entity that may request a service, order a service, provide a service, or facilitate the providing of the service. For example, the user may be a passenger, a driver, an operator, or the like, or any combination thereof. In the present disclosure, "passenger," "user equipment," "user terminal," and "passenger terminal" may be used interchangeably, and "driver" and "driver terminal" may be used interchangeably.

The term "service request" refers to a request that may be initiated by a user (e.g., a passenger, a requester, an operator, a service requester, a customer, a driver, a provider, a service provider, a supplier). The service request may relate to the point of interest (POI) where the user may want to go.

The system may find applications in many fields, e.g., a taxi transportation service, a driving application, a distributing application, a map application, or a navigation application, etc.

In accordance with some embodiments of the present disclosure, search service may be processed using one or more machine learning algorithms, such as a neural network algorithm, a sort algorithm, a regression algorithm, an instance-based algorithm, a normalized algorithm, a decision tree algorithm, a Bayesian algorithm, a clustering algorithm, an association rule algorithm, a deep learning algorithm, and a reduced dimension algorithm, or the like, or any combination thereof. For example, the neural network algorithm may include, a recurrent neural network, a perceptron neural network, a back propagation, a Hopfield network, a self-organizing map (SOM), or a learning vector quantization (LVQ), etc. The regression algorithm may include an ordinary least square, a logistic regression, a stepwise regression, a multivariate adaptive regression spline, a locally estimated scatterplot smoothing, etc. The sort algorithm may include an insert sort, a selection sort, a merge sort, a heap sort, a bubble sort, a shell sort, a comb sort, a counting sort, a bucket sort, a radix sort, or the like, or any combination thereof. The instance-based algorithm may include a k-nearest neighbor (KNN), a learning vector quantization (LVQ), a self-organizing map (SOM), etc. The normalized algorithm may include a RIDge regression, a least absolute shrinkage and selection operator (LASSO), or an elastic net. The decision tree algorithm may include a classification and regression tree (CART), an iterative Dichotomiser 3 (ID3), a C4.5, a chi-squared automatic interaction detection (CHAID), a decision stump, a random forest, a multivariate adaptive regression spline (MARS), or a gradient boosting machine (GBM), etc. The Bayesian algorithm may include a naive Bayesian algorithm, an averaged one-dependence estimators (AODE) or a Bayesian belief network (BBN), etc. The kernel-based algorithm may include a support vector machine (SVM), a radial basis function (RBF), or a linear discriminate analysis (LDA), etc. The clustering algorithm may include a k-means clustering algorithm, a fuzzy c-mean clustering algorithm, a hierarchical clustering algorithm, a Gaussian clustering algorithm, a MST based clustering algorithm, a kernel k-means clustering algorithm, a density-based clustering algorithm, or the like. The association rule algorithm may include an Apriori algorithm or an Eclat algorithm, etc. The deep learning algorithm may include a restricted Boltzmann machine (RBN), a deep belief networks (DBN), a convolutional network, a stacked autoencoders, etc. The reduced dimension algorithm may include a principle component analysis (PCA), a partial least square regression (PLS), a Sammon mapping, a multi-dimensional scaling (MDS), a Projection Pursuit, etc.

An aspect of the present disclosure relates to systems and methods for online to offline service. The system may receive a service order from a first terminal associated with a passenger, the service order including a first identifier corresponding to the passenger and a pick-up location designated by the passenger. The system may further determine a second identifier corresponding to a driver accepting the service order. The system may further obtain first status corresponding to the first identifier. The system may further generate, based on the first status, a first instruction. The system may further send the first instruction to a second terminal associated with the second identifier.

It should be noted that online to offline transportation service, such as online taxi-hailing, is a new form of service rooted only in post-Internet era. It provides technical solutions to users and service providers that could raise only in post-Internet era. In pre-Internet era, when a user hails a taxi on street, the taxi request and acceptance occur only between the passenger and one taxi driver that sees the passenger. If the passenger hails a taxi through a telephone call, the service request and acceptance by a service provider may occur only between the passenger and the service provider (e.g., a taxi company or agent). Online taxi, however, allows a user of the service to reserve a service and automatic distribute the reservation service request to a vast number of individual service providers (e.g., taxi drivers) distance away from the user. It also allows a plurality of service providers to respond the service request simultaneously and in real-time. Therefore, through the Internet, the online to offline transportation systems may provide a much more efficient transaction platform for the users and the service providers that may never meet in a traditional pre-Internet transportation service system. Allocating appointment orders provides a service for both requesters and service providers efficiently.

FIG. 1 is a block diagram of an exemplary online to offline service system 100 according to some embodiments. For example, the online to offline service system 100 may be an online transportation service platform for transportation service such as taxi hailing, chauffeur service, express car, carpool, bus service, driver hire and shuttle service. The online to offline service system 100 may be an online platform including a server 110, a network 120, one or more user terminals (e.g., one or more passenger terminals 130, driver terminals 140), and a storage 150. The server 110 may include a processing engine 112. It should be noted that the online to offline service system 100 shown in FIG. 1 is merely an example, and not intended to be limiting.

In some embodiments, the online to offline service system 100 may include the passenger terminal(s) 130 or the driver terminal(s) 140. The use of "passenger" and "service provider/driver/driver terminal" is regarded to the online search service platform. When "service requester," "user," "user terminal," "terminal," or "user equipment" is used, it is regarded to all location-based service (LBS) including the online search service and the navigation service. In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the one or more user terminals (e.g., the one or more passenger terminals 130, driver terminals 140), and/or the storage 150 via the network 120. As another example, the server 110 may be directly connected to the one or more user terminals (e.g., the one or more passenger terminals 130, driver terminals 140), and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 300 having one or more components illustrated in FIG. 3 in the present disclosure.

In some embodiments, the server 110 may include a processing engine 112. The processing engine 112 may process information and/or data. The information and/or data may be related to status information relating to a passenger. For example, the processing engine 112 may obtain a service order from a first terminal associated with a passenger. The service order may include a first identifier corresponding to the passenger and a pick-up location designated by the passenger. The processing engine 112 may determine a second identifier corresponding to a driver accepting the service order. The processing engine 112 may obtain first status corresponding to the first identifier. The processing engine 112 may generate, based on the first status, a first instruction. The processing engine 112 may send the first instruction to a second terminal associated with the second identifier. In some embodiments, the processing engine 112 may include one or more processing engines (e.g., signal-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the online to offline service system 100 (e.g., the server 110, the one or more passenger terminals 130 the one or more driver terminal 140, or the storage 150) may send information and/data to other component(s) in the online to offline service system 100 via the network 120. For example, the server 110 may obtain/acquire service request from the passenger terminal 130 via the network 120. In some embodiments, the network 120 may be any type of wired or wireless network, or any combination thereof. Merely by way of example, the network 120 may include a cable network, a wireline network, an optical fiber network, a telecommunications network, an intranet, an internet, a local area network (LAN), a wide area network (WAN), a wireless local area network (WLAN), a metropolitan area network (MAN), a wide area network (WAN), a public telephone switched network (PTSN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

In some embodiments, a passenger may be a user of the passenger terminal 130. In some embodiments, the user of passenger terminal 130 may be someone other than the passenger. For example, a user A of the passenger terminal 130 may use the passenger terminal 130 to send a search request for the passenger. In some embodiments, a driver may be a user of the driver terminal 140. In some embodiments, the user of the driver terminal 140 may be someone other than the driver. For example, a user B of the driver terminal 140 may use the driver terminal 140 to send a search service request for the driver. In some embodiments, "passenger" and "passenger terminal" may be used interchangeably, and "driver" and "driver terminal" may be used interchangeably.

In some embodiments, the passenger terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the passenger terminal 130 may be a device with positioning technology for locating the position of the service requester and/or the passenger terminal 130.

In some embodiments, the driver terminal 140 may be similar to, or the same device as the passenger terminal 130. For example, the driver terminal 140 may include a mobile device 140-1, a tablet computer 140-2, a laptop computer 140-3, a built-in device in a motor vehicle 140-4, or the like, or any combination thereof. In some embodiments, the driver terminal 140 may be a device with positioning technology for locating the position of the driver and/or the driver terminal 140. In some embodiments, the passenger terminal 130 and/or the driver terminal 140 may communicate with other positioning device to determine the position of the service requester, the passenger terminal 130, the driver, and/or the driver terminal 140. In some embodiments, the passenger terminal 130 and/or the driver terminal 140 may send positioning information to the server 110.

The storage 150 may store data and/or instructions. In some embodiments, the storage 150 may store data obtained from the one or more user terminals (e.g., the one or more passenger terminals 130, driver terminals 140). For example, the storage 150 may store a service order from the passenger terminal 130. As another example, the storage 150 may store data acquired by sensors installed the passenger terminal 130. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the online to offline service system 100 (e.g., the server 110, the one or more user terminals, etc.). One or more components in the online to offline service system 100 may access the data and/or instructions stored in the storage 150 via the network 120. In some embodiments, the storage 150 may be directly connected to or communicate with one or more components in the online to offline service system 100 (e.g., the server 110, the one or more user terminals, etc.). In some embodiments, the storage 150 may be part of the server 110.

In some embodiments, one or more components in the online to offline service system 100 (e.g., the server 110, the one or more user terminals, etc.) may have a permission to access the storage 150. In some embodiments, one or more components in the online to offline service system 100 may read and/or modify information relating to the service requester, driver, and/or the public when one or more conditions are met. For example, the server 110 may read and/or modify one or more users' information after a service.

In some embodiments, information exchanging of one or more components of the online to offline service system 100 may be achieved by way of requesting a search service. The object of the search service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the online to offline service system 100 performs, the element may perform through electrical signals and/or electromagnetic signals. For example, when the passenger terminal 130 processes a task, such as making a determination, identifying or selecting an object, the passenger terminal 130 may operate logic circuits in its processor to process such task. When the passenger terminal 130 sends out a service request to the server 110, a processor of the service requestor terminal 130 may generate electrical signals encoding the request. The processor of the passenger terminal 130 may then send the electrical signals to an output port. If the passenger terminal 130 communicates with the server 110 via a wired network, the output port may be physically connected to a cable, which further transmit the electrical signal to an input port of the server 110. If the passenger terminal 130 communicates with the server 110 via a wireless network, the output port of the passenger terminal 130 may be one or more antennas, which convert the electrical signal to electromagnetic signal. Similarly, a passenger terminal 130 may process a task through operation of logic circuits in its processor, and receive an instruction and/or service request from the server 110 via electrical signal or electromagnet signals. Within an electronic device, such as the passenger terminal 130, the driver terminal 140, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
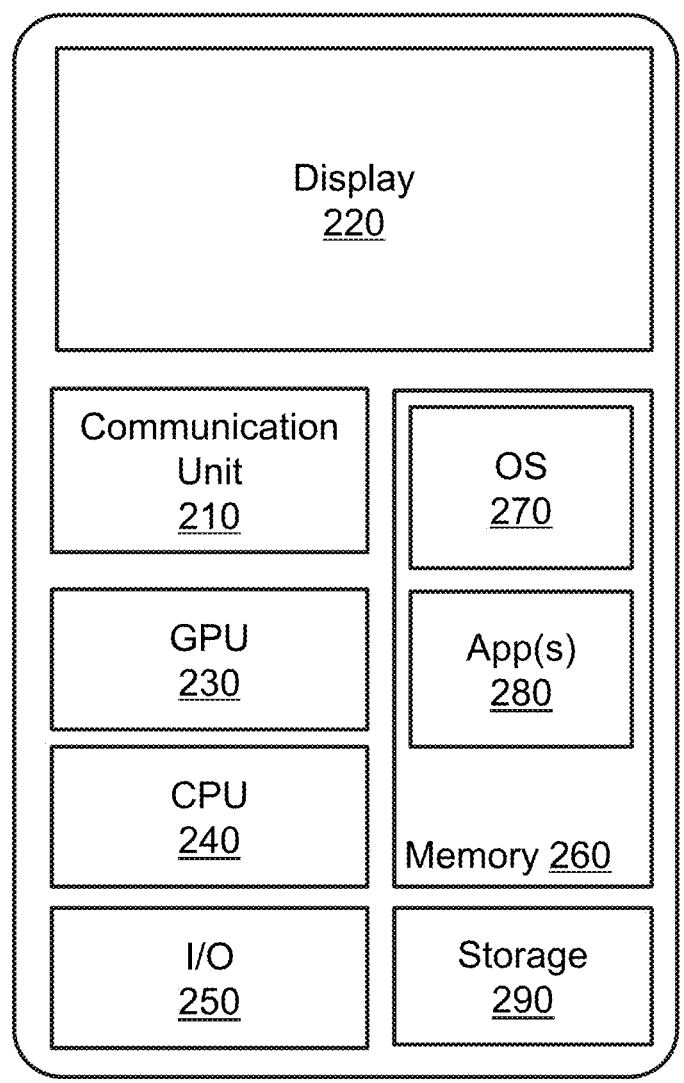
FIG. 2 is a block diagram of an exemplary mobile device configured to implement a specific system disclosed in the present disclosure.

FIG. 2 is a block diagram of an exemplary mobile device configured to implement a specific system disclosed in the present disclosure. In some embodiments, a user terminal device configured to display and communicate information related to locations may be a mobile device 200. The mobile device may include but is not limited to a smartphone, a tablet computer, a music player, a portable game console, a GPS receiver, a wearable calculating device (e.g. glasses, watches, etc.), or the like. The mobile device 200 may include one or more central processing units (CPUs) 240, one or more graphical processing units (GPUs) 230, a display 220, a memory 260, a communication unit 210, a storage unit 290, and one or more input/output (I/O) devices 250. Moreover, the mobile device 200 may also be any other suitable component that includes but is not limited to a system bus or a controller (not shown in FIG. 2). As shown in FIG. 2, a mobile operating system 270 (e.g. IOS, Android, Windows Phone, etc.) and one or more applications 280 may be loaded from the storage unit 290 to the memory 260 and implemented by the CPUs 240. The application 280 may include a browser or other mobile applications configured to receive and process information related to a query (e.g., a name of a location) inputted by a user in the mobile device 200. The passenger/driver may obtain information related to one or more search results through the system I/O device 250, and provide the information to the server 110 and/or other modules or units of the online to offline service system 100 (e.g., the network 120).

In order to implement various modules, units and their functions described above, a computer hardware platform may be used as hardware platforms of one or more elements (e.g., the server 110 and/or other sections of the online to offline service system 100 described in FIG. 1 through FIG. 9). Since these hardware elements, operating systems and program languages are common, it may be assumed that persons skilled in the art may be familiar with these techniques and they may be able to provide information required in the online to offline service according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the Figures.

Figure 3:
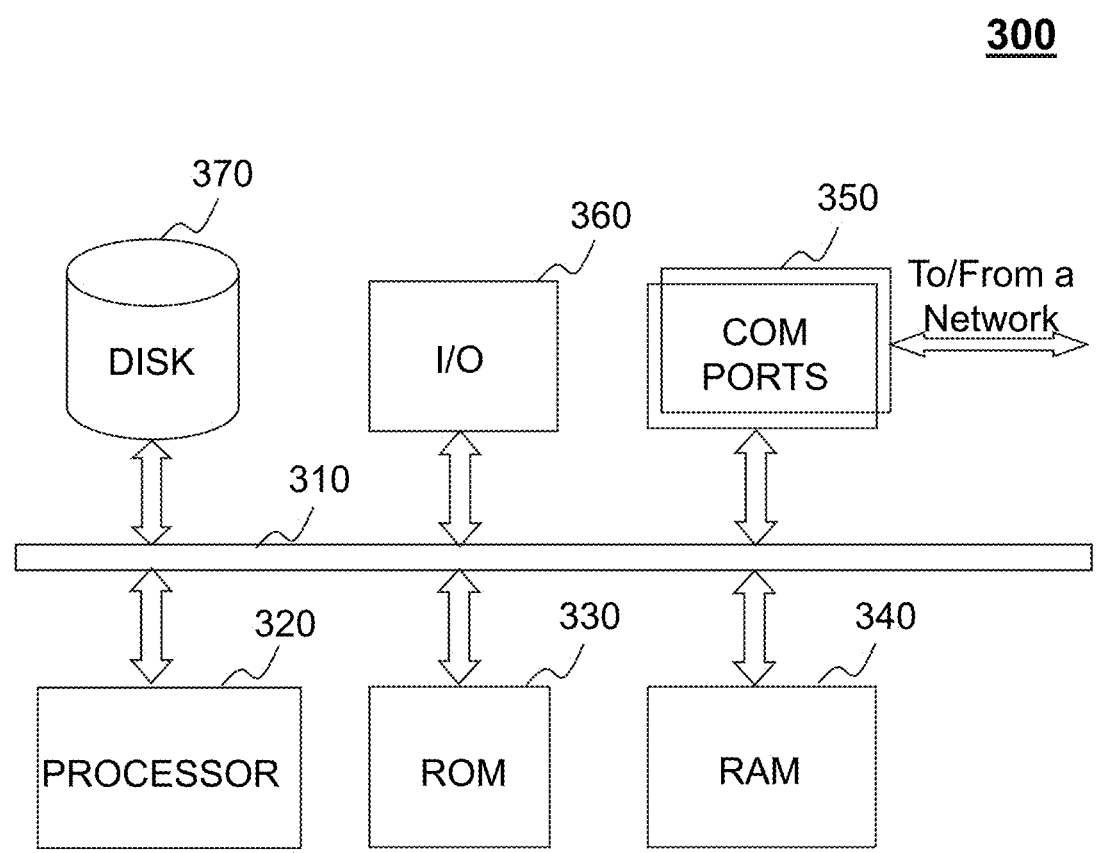
FIG. 3 is a block diagram illustrating an exemplary computing device according to some embodiments of the present disclosure.

FIG. 3 is a block diagram illustrating exemplary hardware and software components of a computing device 300 on which the server 110, the one or more user terminals (e.g., the one or more passenger terminals 130, driver terminals 140) may be implemented according to some embodiments of the present disclosure. The computing device 300 may be configured to perform one or more functions of the server 110, passenger terminal 130, and driver terminal 140 disclosed in this disclosure. For example, the processing engine 112 may be implemented on the computing device 300 and configured to perform functions of the processing engine 112 disclosed in this disclosure.

The computing device 300 may be a general-purpose computer or a special purpose computer, both may be used to implement an online to offline service system 100 for the present disclosure. The computing device 300 may be used to implement any component of the online to offline service system 100 as described herein. For example, the processing engine 112 may be implemented on the computing device 300, via its hardware, software program, firmware, or a combination thereof. Although only one such computer is shown, for convenience, the computer functions relating to the search service as described herein may be implemented in a distributed fashion on a number of similar platforms to distribute the processing load.

The computing device 300, for example, may include COM ports 250 connected to and from a network connected thereto to facilitate data communications. The computing device 300 may also include a processor 320, in the form of one or more processors, for executing program instructions. The exemplary computer platform may include an internal communication bus 310, program storage and data storage of different forms, for example, a disk 370, and a read only memory (ROM) 330, or a random access memory (RAM) 340, for various data files to be processed and/or transmitted by the computer. The exemplary computer platform may also include program instructions stored in the ROM 330, RAM 340, and/or other type of non-transitory storage medium to be executed by the processor 320. The methods and/or processes of the present disclosure may be implemented as the program instructions. The computing device 300 may also include an I/O component 360, supporting input/output between the computer and other components therein. The computing device 300 may also receive programming and data via network communications.

The computing device 300 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only one CPU and/or processor is described in the computing device 300. However, it should be noted that the computing device 300 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 300 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 4:
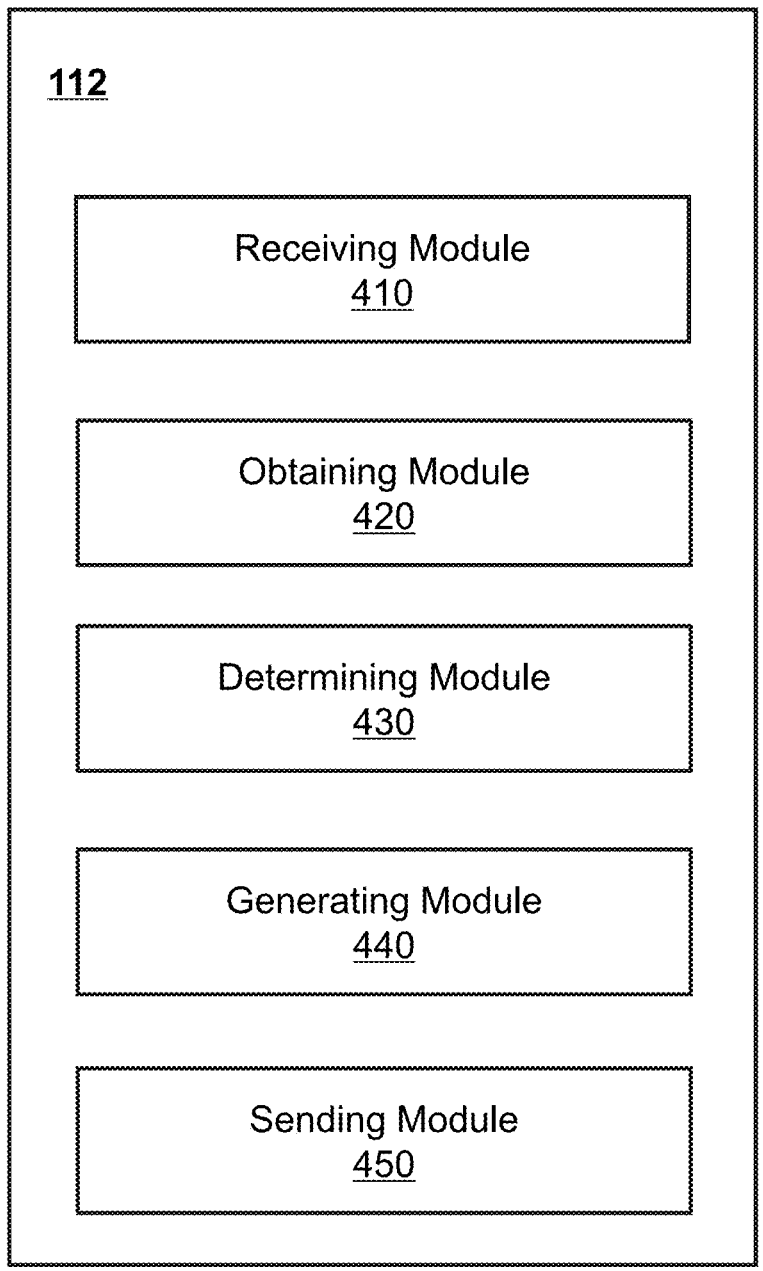
FIG. 4 is a block diagram illustrating an exemplary processing engine according to some embodiments of the present disclosure.

FIG. 4 is a block diagram illustrating an exemplary processing engine 112 according to some embodiments of the present disclosure. The processing engine 112 may be in communication with a computer-readable storage (e.g., the storage 150, the passenger terminal 130, or the driver terminal 140) and may execute instructions stored in the computer-readable storage medium. The processing engine 112 may include a receiving module 410, an obtaining module 420, a determining module 430, a generating module 440, and a sending module 450. The modules may be hardware circuits of at least part of the processing engine 112. The modules may also be implemented as an application or set of instructions read and executed by the processing engine 112. Further, the modules may be any combination of the hardware circuits and the application/instructions. For example, the modules may be the part of the processing engine 112 when the processing engine 112 is executing the application/set of instructions.

The receiving module 410 may receive a service order from a first terminal associated with a passenger. The service order may include a first identifier corresponding to the passenger and a pick-up location designated by the passenger. In some embodiments, the receiving module 410 may receive a sending request from a passenger terminal associated with the passenger. The sending request may include clothing data corresponding to the first identifier, a location corresponding to the first identifier, the first status corresponding to the first identifier, etc.

The obtaining module 420 may obtain data. In some embodiments, the obtaining module 420 may obtain first status corresponding to the first identifier. Further, the obtaining module 420 may obtain a GPS location associated with the first identifier and/or sensor data of the first terminal. In some embodiments, the obtaining module 420 may obtain one or more historical orders associated with a building associated with the service order, and a travel time for the passenger to arrive at an exit of the building based on the one or more historical orders. In some embodiments, the obtaining module 420 may obtain a sending request including a second status corresponding to the first identifier from the first terminal. The second status may include the dress of the passenger, a current location of the passenger, other information (e.g., a temporary condition causing the driver to wait a minute, the estimated travel time for the passenger to arrive the pick-up location, etc.) associated with the passenger, or the like, or any combination thereof.

The determining module 430 may determine a second identifier corresponding to a driver accepting the service order.

The determining module 430 may determine whether the passenger arrives at the pick-up location.

The determining module 430 may determine whether a GPS location of the first terminal is available.

The determining module 430 may determine whether a GPS switch of the first terminal is turned on if the GPS location associated with the first identifier/the first terminal is unavailable.

The determining module 430 may determine a first status based on the sensor data including whether the passenger is moving.

The determining module 430 may determine whether the first identifier/the first terminal is moving based on the sensor data of the first terminal.

The determining module 430 may determine a travel time for the passenger to arrive at an exit of a building associated with the service order based on one or more historical orders associated with the building if the first identifier is immobile The determining module 430 may determine whether the passenger arrives at the exit of the building based on the travel time and a Pedestrian Dead Reckoning (PDR) track.

The generating module 440 may generate a first instruction based on the first status.

The generating module 440 may generate the first instruction with a first arrival indication in response to a determination that the passenger arrives at the pick-up location.

The generating module 440 may generate the first instruction including a distance between the GPS location of the first terminal and the pick-up location in response to the determination that the passenger does not arrive at the pick-up location.

The generating module 440 may generate a first instruction indicating that the passenger does not depart if the passenger is immobile.

The generating module 440 may generate a PDR track based on the sensor data of the first terminal.

The generating module 440 may generate a first instruction containing a second arrival indication in response to a determination that the passenger arrives at the exit of the building associated with the service order.

The sending module 430 may send the first instruction to a second terminal associated with the second identifier.

The sending module 430 may send the first instruction with a first arrival indication to the second terminal.

The sending module 430 may send the first instruction including a distance between the GPS location of the first terminal and the pick-up location to the second terminal.

The sending module 430 may send to the second terminal a first instruction indicating that the passenger does not depart if the passenger is immobile.

The sending module 430 may send the first instruction with the second arrival indication to the second terminal.

The sending module 430 may send the sending request, received by the obtaining module 420, to the second terminal.

With regard to the processing engine 112 in this embodiment, a specific manner that each module performs an operation has been described in detail in some embodiments related to a method for processing status information, and detailed description will not be made herein.

The processing engine 112 for processing status information provided in this embodiment by sending the first instruction to the second terminal associated with the driver, who has accepted the service order, may enable the driver to know the passenger's current status in time. Thus, the driver may not need to call the passenger to learn about the passenger's current status, thereby saving time and unnecessary fees.

It should be noted that the methods that can be implemented in this embodiment can either be implemented individually or in combination with other implementation, which will be not limited here.

When the GPS location associated with the passenger is available, the processing engine 112 for processing status information provided in this embodiment may determine whether the passenger arrives at the pick-up location based on the GPS location, and send the first instruction with the first arrival indication or the first instruction including the distance between the GPS location and the pick-up location to the second terminal associated with the driver. As such, the driver may know the current location of the passenger, and find the passenger quickly and accurately thereby, avoiding calling the passenger because of not knowing the passenger's current status and saving time and unnecessary fees.

When the GPS signals of the first terminal is unavailable, and the GPS switch of the first terminal is on, the processing engine 112 may determine whether the first identifier corresponding to the passenger is immobile based on the sensor data of the first terminal. If the first identifier corresponding to the passenger is immobile, the processing engine 112 may generate the first instruction indicating that the passenger does not depart, and send the first instruction to the second terminal associated with the driver. The driver may know the passenger's current status in time. If the driver has arrived at the pick-up location, the driver may consider calling the passenger to inform the passenger her/his arrival, and ask the passenger to arrive at the pick-up location as quickly as possible.

After determining that the GPS switch of the first terminal associated with the first identifier and the passenger is immobile, the processing engine 112 for processing status information provided by this embodiment may determine whether the passenger arrives at the exit of the building associated with the service order based on the one or more historical orders associated with the building and the PDR track associated with the passenger, thereby avoiding misjudging the passenger does not depart because the GPS switch of the first terminal is off and providing the driver with more accurate the passenger's status information.

It should be noted that the descriptions above in relation to processing engine 112 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the processing engine 112 may further include a storage module (not shown in FIG. 4). The storage module may be configured to store data generated during any process performed by any component of in the processing engine 112. As another example, each of components of the processing engine 112 may associate with a storage module. Additionally or alternatively, the components of the processing engine 112 may share a common storage module. Similar modifications should fall within the scope of the present disclosure.

Figure 5:
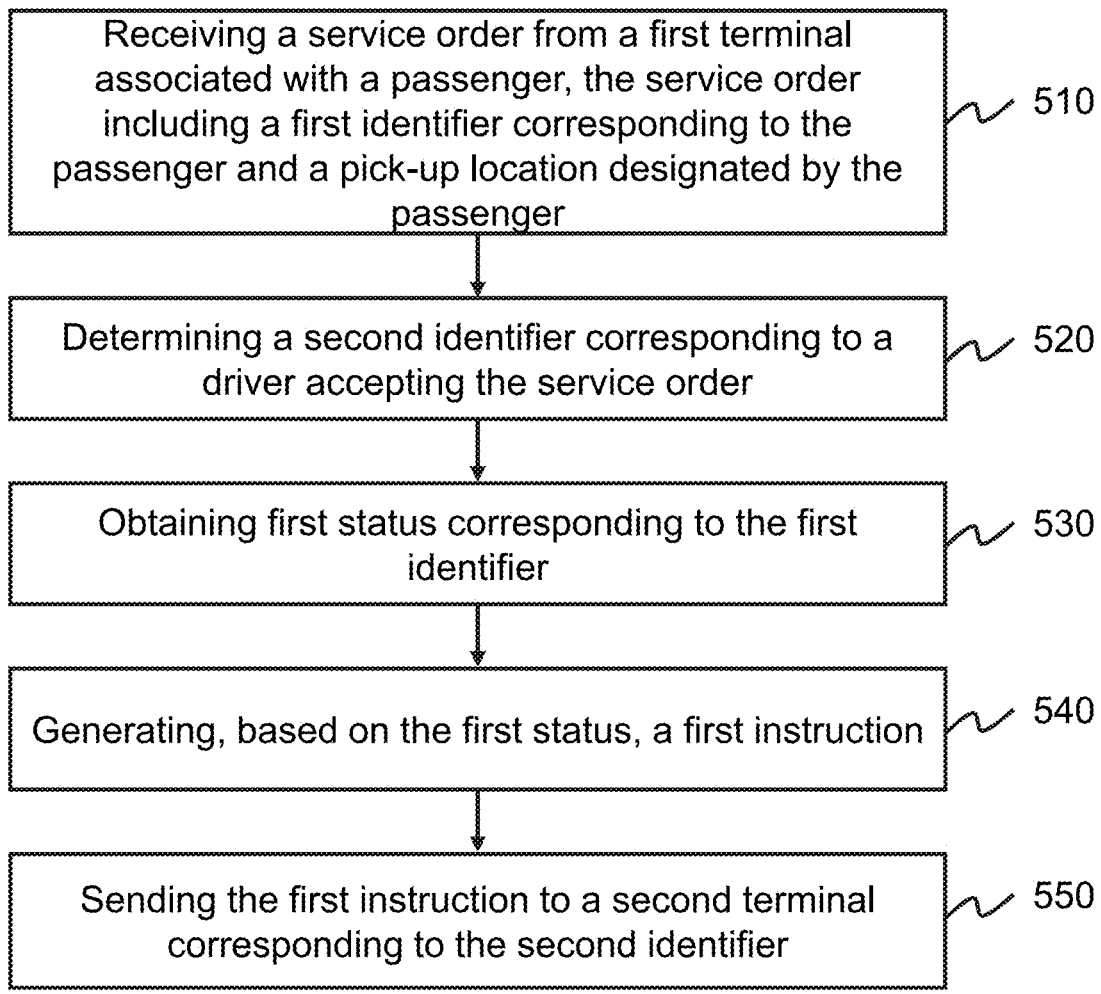
FIG. 5 is a flowchart of an exemplary process for processing status information according to some embodiments of the present disclosure.

FIG. 5 is a flowchart of an exemplary process 500 for processing status information according to some embodiments of the present disclosure. In some embodiments, the process 500 for the status information may be implemented in the system 100 as illustrated in FIG. 1. For example, the process 500 may be implemented in a user terminal (e.g., the passenger terminal 130, and the driver terminal 140) and/or the server 110. The process 500 may also be implemented as one or more instructions stored in the storage 150 and called and/or executed by the processing engine 112.

In 510, the processing engine 112 (e.g., the receiving module 410) may receive a service order from a first terminal associated with a passenger. The service order may include a first identifier corresponding to the passenger and a pick-up location designated by the passenger. The first identifier may be used to identify the passenger. For example, the first identifier may include an account number associated with the passenger, a phone number of the passenger, an ID number of the passenger, a name of the passenger, or the like, or a combination thereof. In some embodiments, the first terminal may include a mobile terminal such as a mobile phone, a laptop, a tablet, etc. In some embodiments, the processing engine 112 (e.g., the obtaining module 420) may obtain the service order from the first terminal (e.g., the passenger terminal 130). For example, the passenger may send the service order through a taxi-hailing application installed in a mobile phone associated with the passenger to the processing engine 112. In some embodiments, the processing engine 112 (e.g., the obtaining module 420) may obtain the service order from the storage 150, or any other storage.

In 520, the processing engine 112 (e.g., the determining module 430) may determine a second identifier corresponding to a driver accepting the service order. The second identifier may be used to identify the driver who accepts the service order. For example, the second identifier may include an account number associated with the driver, a phone number of the driver, an ID number of the passenger, a name of the passenger, a license plate of the vehicle associated with the driver, or the like, or a combination thereof.

In some embodiments, the driver may grab the service order via a taxi-hailing application installed in a second terminal (e.g., the driver terminal 140) associated with the driver. For example, after the processing engine 112 receives the service order, the processing engine 112 may send the service order to one or more candidate terminals (e.g., the mobile device 140-1, the tablet computer 140-2, etc.) associated with one or more candidate drivers. After each candidate driver sees the service order through one of the candidate terminals, the each candidate driver may determine whether it is possible to accept the service order based on the pick-up location. If the pick-up the location is close to the driver, and a car associated with the driver is empty, the driver may choose to grab the service order.

In some embodiments, the processing engine 112 may dispatch the service order to the driver. For example, the processing engine 112 may acquire status of each of one or more candidate drivers through the one or more candidate terminals (e.g., one or more mobiles) associated with the one or more candidate drivers, and dispatch the service order based on the status of each of one or more candidate drivers. For a further example, the processing engine 112 may determine which candidate driver is assigned to the service order based on whether the candidate driver is working, whether a car associated with the candidate driver is empty, the current location of the driver, etc. Further, the processing engine 112 may determine the second identifier corresponding to a driver accepting the service order.

In 530, the processing engine 112 (e.g., the obtaining module 420) may obtain first status corresponding to the first identifier. It should be noted that the first status corresponding to the first identifier may also referred to as the status of the passenger. For example, the first identifier is moving may indicate the passenger is moving. In some embodiments, the first status may include a movement status corresponding to the first identifier (or the passenger associated with the first identifier). For example, the movement status corresponding to the first identifier may include whether the passenger is moving or immobile. In some embodiments, the processing engine 112 may obtain sensor data of the first terminal, and determine a movement status of the passenger based on the sensor data. Exemplary sensor data may include data acquired by a gravity sensor, an acceleration sensor, a gyroscope, GPS, a heart rate sensor, or the like, or a combination thereof.

In some embodiments, the first status may include a location status corresponding to the first identifier. For example, the location status may include a current location of the passenger, a distance between the current location of the passenger and the pick-up location, whether the passenger arrives at the pick-up location, whether the passenger is indoors, whether the passenger arrives at an exit of a building, etc. In some embodiments, the location status may be determined based on the current location of the passenger and/or the pick-up location. The current location of the passenger may be determined based on GPS, BDS, etc. For example, the processing engine 112 may obtain a GPS location of the first terminal, and determine whether the passenger (or the first terminal) arrives at the pick-up location based on a distance between the GPS location and the pick-up location. In some embodiments, the location status may be determined based on the status of the first terminal. For example, the processing engine 112 may determine whether the GPS location of the first terminal is available from the first terminal. If the processing engine 112 determines that the GPS location is unavailable and determines that the GPS switch of the first terminal is on, the processing engine 112 may determine that the passenger is indoor.

In 540, the processing engine 112 (e.g., the generating module 440) may generate, based on the first status, a first instruction.

After determining the second identifier corresponding to the driver accepting the service order, the processing engine 112 may obtain the first status corresponding to the first identifier, and generate the first instruction based on the first status. For example, if the processing engine 112 determines that the passenger is moving, the processing engine 112 may generate the first instruction including the passenger is moving. Further, the processing engine 112 may send the first instruction indicating that the passenger is moving to the pick-up location included in the service order. As another example, if the processing engine 112 determines that the passenger is immobile, the processing engine 112 may generate the first instruction indicating that the passenger is immobile or does not depart. As still an example, if the GPS location is the same as the pick-up location, the processing engine 112 may generate the first instruction with an arrival indication. As still another example, if the processing engine 112 determines that the passenger has not arrived at the pick-up location, the processing engine 112 may generate the first instruction with a non-arrival indication or a distance between the GPS location and the pick-up location. It should be noted that the first status may be any information that can determine the status associated with the passenger, and not intended to limit the scope of the present disclosure.

In 550, the processing engine 112 (e.g., the sending module 450) may send the first instruction to a second terminal associated with the second identifier. The second terminal (e.g., the driver terminal 140) associated with the second identifier may include a mobile terminal such as a mobile phone, a laptop, a tablet, etc. The first instruction may be in form of text, voice, video, or the like, or a combination thereof.

After the processing engine 112 generates the first instruction, the processing engine 112 may send the first instruction to the second terminal associated with the second identifier, such that the driver may understand real-time status of the passenger through the second terminal.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the step 530 and 540 may be merged into a step.

Figure 6:
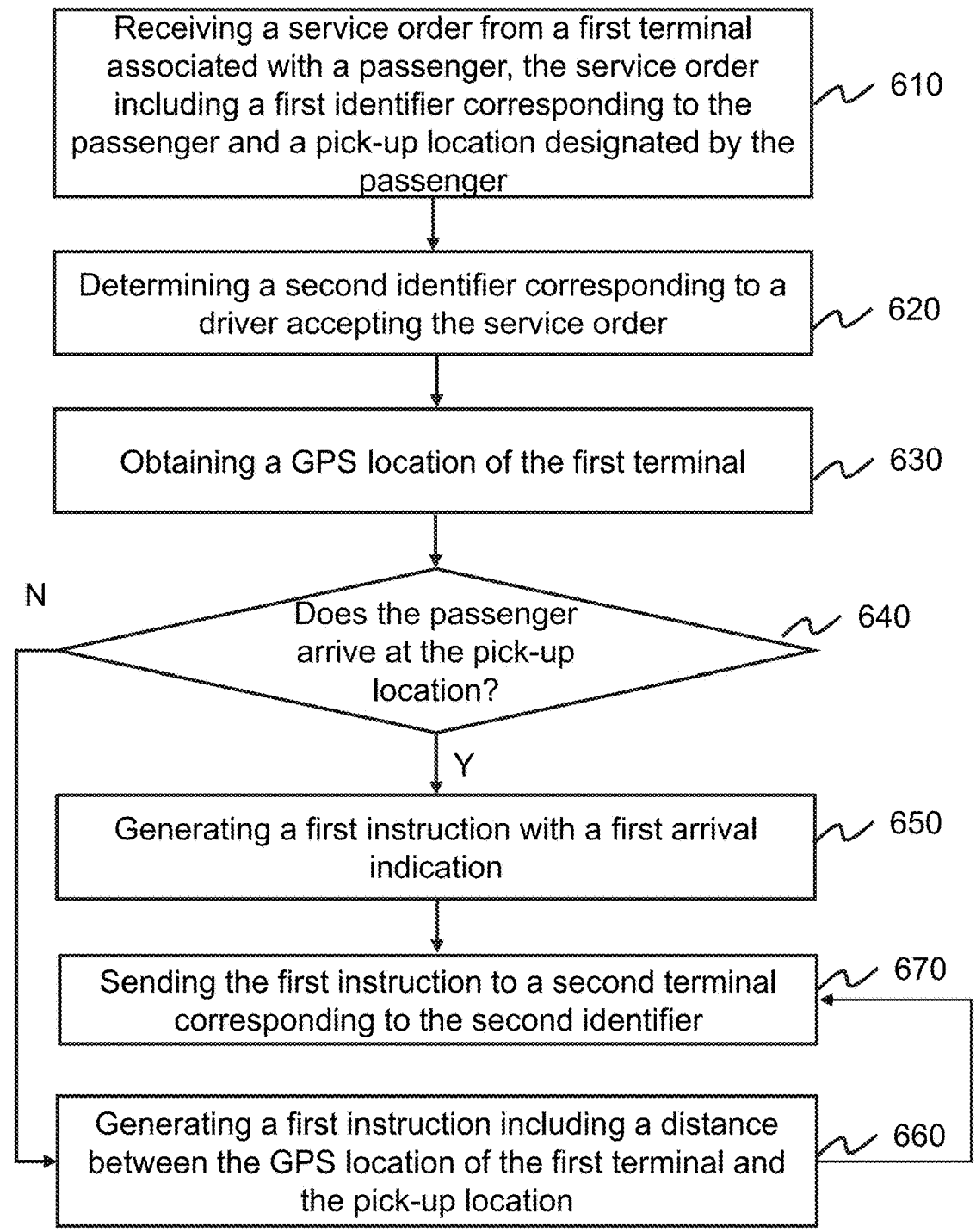
FIG. 6 is a flowchart of another exemplary process for processing status information according to some embodiments of the present disclosure.

FIG. 6 is a flowchart of another exemplary process 600 for processing status information according to some embodiments of the present disclosure. In some embodiments, the process 600 for the status information may be implemented in the system 100 as illustrated in FIG. 1. For example, the process 600 may be implemented in a user terminal (e.g., the passenger terminal 130, driver terminal 140) and/or the server 110. The process 600 may also be implemented as one or more instructions stored in the storage 150 and called and/or executed by the processing engine 112.

In 610, the processing engine 112 (e.g., the receiving module 410) may receive a service order from a first terminal associated with a passenger. The service order may include a first identifier corresponding to the passenger and a pick-up location designated by the passenger. More descriptions for receiving the service order may be in connection with step 510 as described in FIG. 5.

In 620, the processing engine 112 (e.g., the determining module 430) may determine a second identifier corresponding to a driver accepting the service order. More description for determining the second identifier corresponding to the driver accepting the service order may be in connection with step 520 as described in FIG. 5.

In 630, the processing engine 112 (e.g., the obtaining module 420) may obtain a GPS location of the first terminal. As used herein, the GPS location of the first terminal may also represent the location of the first identifier (or the passenger). The GPS location of the first terminal may be determined based on GPS installed in the first terminal. In some embodiments, if the first terminal is located outdoors (e.g., in a park) and the GPS switch is on, the GPS installed in the first terminal may locate the first terminal. Further, the processing engine 112 may obtain the GPS location from the first terminal if the GPS can locate the first terminal.

In 640, the processing engine 112 (e.g., the determining module 430) may determine whether the passenger arrives at the pick-up location. If the processing engine 112 determines that the passenger arrives at the pick-up location, the processing engine 112 may proceed to perform step 650. If the processing engine 112 determines that the passenger does not arrive at the pick-up location, the processing engine 112 may proceed to perform step 670.

The processing engine 112 may determine whether the passenger has arrived at the pick-up location based on the GPS location of the first terminal and the pick-up location. For example, the processing engine 112 may determine a distance between the GPS location of the first terminal and the pick-up location. If the processing engine 112 determines that the distance is less than a first threshold (e.g., 3 meters, 2 meters, 1 meters, 0 meters, etc.), the processing engine 112 may determine that the passenger arrives at the pick-up location. If the processing engine 112 determines that the distance equals to or exceeds the first threshold, the processing engine 112 may determine that the passenger does not arrive at the pick-up location. As another example, the processing engine 112 may determine whether the location names corresponding to the GPS location and the pick-up location are similar. If the processing engine 112 determines that the similarity between these two names is less than a second threshold (e.g., 0.9), the processing engine 112 may determine that the passenger does not arrive at the pick-up location. The similarity between two names may refer to a similarity between spellings of the two names, pronunciations of the two names, or a combination thereof. For example, a name of a GPS location may be "Peace Gate Subway Station". A name of the pick-up location may be "Peace Gate Subway Station". The processing engine 112 may determine that a similarity between "Peace Gate Subway Station" and "Peace Gate Subway Station" is 100% and is greater than the second threshold (e.g., 0.9). Then, the processing engine 112 may determine that the passenger does not arrive at the pick-up location.

If the processing engine 112 determines that the similarity between location names corresponding to the GPS location and the pick-up location equals to or exceeds the second threshold (e.g., 0.9), the processing engine 112 may determine that the passenger arrives at the pick-up location. The first threshold and/or the second threshold may be set by a user (e.g., the driver) via a terminal associated with the user (e.g., the driver terminal 140) or according to a default setting of the online to offline service system 100.

In 650, the processing engine 112 (e.g., the generating module 440) may generate a first instruction with a first arrival indication. If the passenger arrives at the pick-up location, the processing engine 112 may generate the first instruction with the first arrival indication. The first arrival indication may indicate that the passenger has arrived at the pick-up location.

In 660, the processing engine 112 (e.g., the generating module 440) may generate a first instruction including a distance between the GPS location of the first terminal and the pick-up location. If the passenger does not arrive at the pick-up location, the processing engine 112 may generate the first instruction including the distance between the GPS location of the first terminal and the pick-up location.

In 670, the processing engine 112 (e.g., the sending module 430) may send the first instruction to a second terminal corresponding to the second identifier. In some embodiments, if the processing engine 112 (e.g., the sending module 430) determines that the passenger arrives at the pick-up location, the first instruction may include the first arrival indication. If the processing engine 112 (e.g., the sending module 430) determines that the passenger does arrives at the pick-up location, the first instruction may include the distance between the GPS location of the first terminal and the pick-up location.

More descriptions for sending the first instruction to the second terminal may be in connection with step 550 as described in FIG. 5.

When the GPS location of the passenger is available, the method for processing status information provided in this embodiment may determine whether the passenger arrives at the pick-up location based on the GPS location, and send the first instruction with the first arrival indication or the first instruction including the distance between the GPS location and the pick-up location to the second terminal associated with the driver. The driver may know the current location associated with the passenger, and find the passenger quickly and accurately.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 630, the processing engine 112 (e.g., the obtaining module 420) may obtain a BDS location. As another example, operation 620 may be omitted. In some embodiments, in 660, the processing engine 112 (e.g., the obtaining module 420) may determine an estimated travel time for the passenger to arrive at the pick-up location from the GPS location. The processing engine 112 (e.g., the obtaining module 420) may further generate the first instruction with the estimated travel time.

Figure 7:
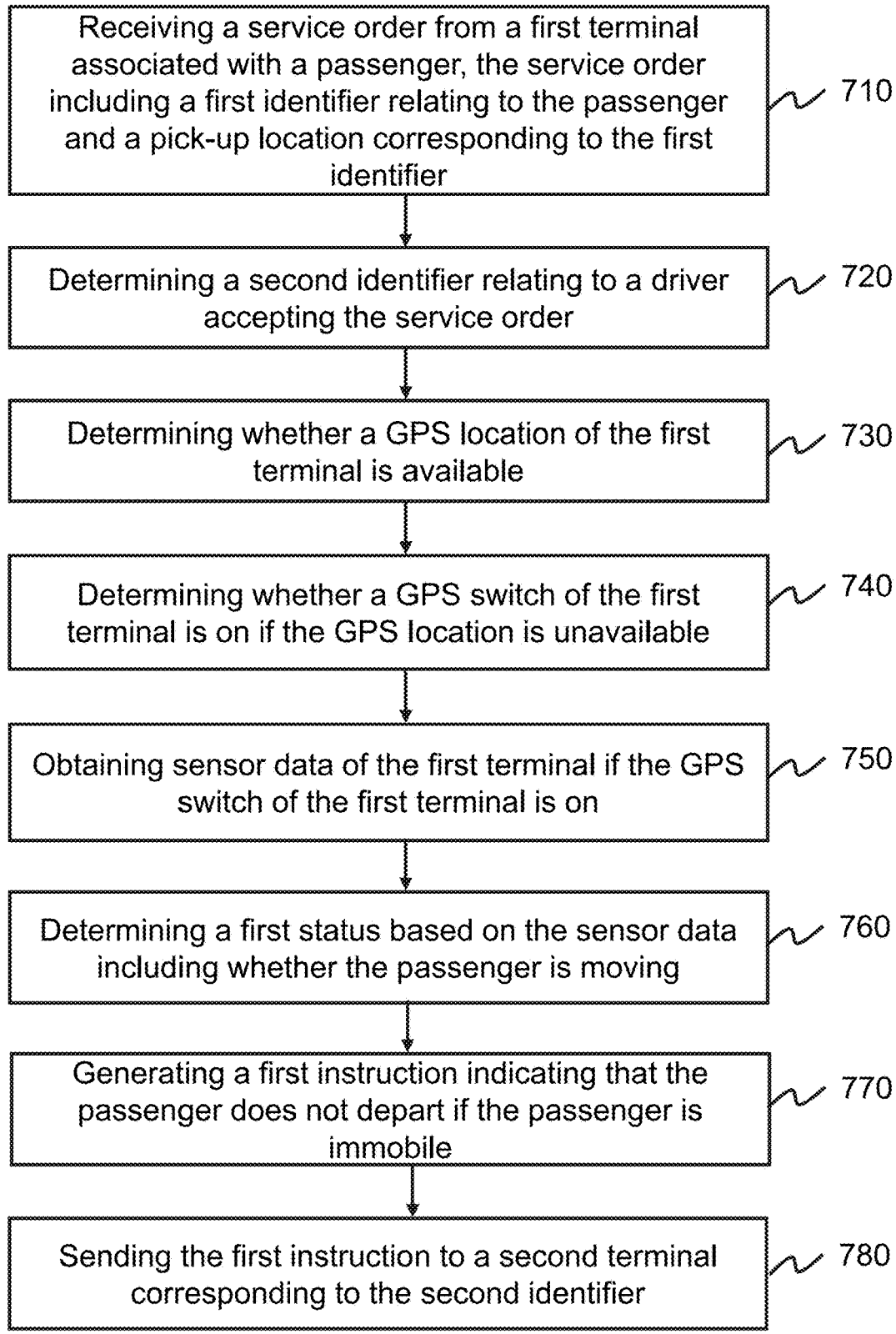
FIG. 7 is a flowchart of another exemplary process for processing status information according to some embodiments of the present disclosure.

FIG. 7 is a flowchart of another exemplary process 700 for processing status information according to some embodiments of the present disclosure. In some embodiments, the process 700 for the status information may be implemented in the system 100 as illustrated in FIG. 1. For example, the process 700 may be implemented in a user terminal (e.g., the passenger terminal 130, driver terminal 140) and/or the server 110. The process 700 may also be implemented as one or more instructions stored in the storage 150 and called and/or executed by the processing engine 112.

In 710, the processing engine 112 (e.g., the receiving module 410) may receive a service order from a first terminal associated with a passenger. The service order may include a first identifier corresponding to the passenger and a pick-up location designated by the passenger. More descriptions for receiving the service order may be in connection with step 510 as described in FIG. 5. Therefore, the detailed explanation thereof is not repeated here for brevity.

In 720, the processing engine 112 (e.g., the determining module 430) may determine a second identifier corresponding to a driver accepting the service order. More description for determining the second identifier corresponding to the driver accepting the service order may be in connection with step 520 as described in FIG. 5.

In 730, the processing engine 112 (e.g., the determining module 430) may determine whether a GPS location of the first terminal is available. The GPS location of the first terminal may be determined based on GPS installed in the first terminal. In some embodiments, if the first terminal is located indoors (e.g., in a building), the GPS installed in the first terminal may not locate the first terminal. In some embodiments, if the GPS switch of the first terminal is off, the GPS installed in the first terminal may not locate the first terminal. Further, the processing engine 112 may not obtain the GPS location from the first terminal if the GPS cannot locate the first terminal. Then, the processing engine 112 (e.g., the determining module 430) may determine that the GPS location of the first terminal is unavailable.

In 740, the processing engine 112 (e.g., the determining module 430) may determine whether a GPS switch of the first terminal is on if the GPS location is unavailable.

If the GPS location is unavailable, the processing engine 112 may obtain a determination that whether a GPS switch of the first terminal is on.

In 750, the processing engine 112 (e.g., the obtaining module 420) may obtain sensor data of the first terminal if the GPS switch of the first terminal is on. In some embodiments, the processing engine 112 may obtain sensor data of the first terminal from the first terminal (e.g., the passenger terminal 130, the storage 150, or any other storage. Exemplary sensor data may include data acquired by a speed sensor, a gravity sensor, an acceleration sensor, a gyroscope, a heart rate sensor, or the like, or a combination thereof.

If the GPS switch of the first terminal is on, and the GPS location of the first terminal is unavailable, it indicates that the passenger is indoors, and the processing engine 112 may obtain the sensor data of the first terminal.

In 760, the processing engine 112 (e.g., the determining module 430) may determine a first status including whether the passenger is moving based on the sensor data. Further, the processing engine 112 (e.g., the determining module 430) may determine whether the passenger is moving based on a speed of the passenger, an acceleration of the passenger, a displacement of the passenger, a physiological signal (e.g., heart rate, pulse signal, a respiratory signal, etc.), or the like, or a combination thereof. For example, the processing engine 112 (e.g., the determining module 430) may determine the movement speed of the passenger based on the data acquired by the speed sensor installed in the first terminal. Then the processing engine 112 (e.g., the determining module 430) may determine that the passenger is immobile if the determined movement speed of the passenger is lower than a preset threshold (e.g., 0, 1, etc.). As another example, the processing engine 112 (e.g., the determining module 430) may determine the accelerations of the passenger based on the data acquired by the acceleration sensor installed in the first terminal. Then the processing engine 112 (e.g., the determining module 430) may determine that the passenger is immobile if the determined acceleration of the passenger is equal 0.

In 770, the processing engine 112 (e.g., the generating module 440) may generate a first instruction indicating that the passenger does not depart if the passenger is immobile. If the processing engine 112 determines that the first identifier (the passenger) is immobile based on the sensor data of the first terminal, it indicates that the passenger does not depart, and the processing engine 112 may generate the first instruction indicating that the passenger does not depart.

In 780, the processing engine 112 (e.g., the sending module 450) may send the first instruction to a second terminal corresponding to the second identifier. More descriptions for sending the first instruction to the second terminal may be in connection with step 550 as described in FIG. 5. Therefore, the detailed explanation thereof is not repeated here for brevity.

When GPS signals of the first terminal is unavailable, and the GPS switch of the first terminal is on, the method for processing status information provided by this embodiment may determine whether the first identifier corresponding to the passenger is immobile based on the sensor data of the first terminal. If the first identifier corresponding to the passenger is immobile, the processing engine 112 may generate the first instruction indicating that the passenger does not depart, and send the first instruction to the second terminal associated with the driver. The driver may know the current status associated with the passenger in time. If the driver has arrived at the pick-up location, the driver may consider informing the passenger that he/her has arrived at the pick-up location by calling, and ask the passenger to arrive at the pick-up location as quickly as possible.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 740 may be omitted. For example, operation 770 may be omitted and process 700 may further include generating a first instruction indicating that the passenger is moving to an exit of a building if the processing engine 112 determines the first status including the passenger is moving. The processing engine 112 may further determine a travel time for the passenger to arrive at the exit of the building based on one or more historical orders associated with an initial location of the passenger.

Figure 8A:
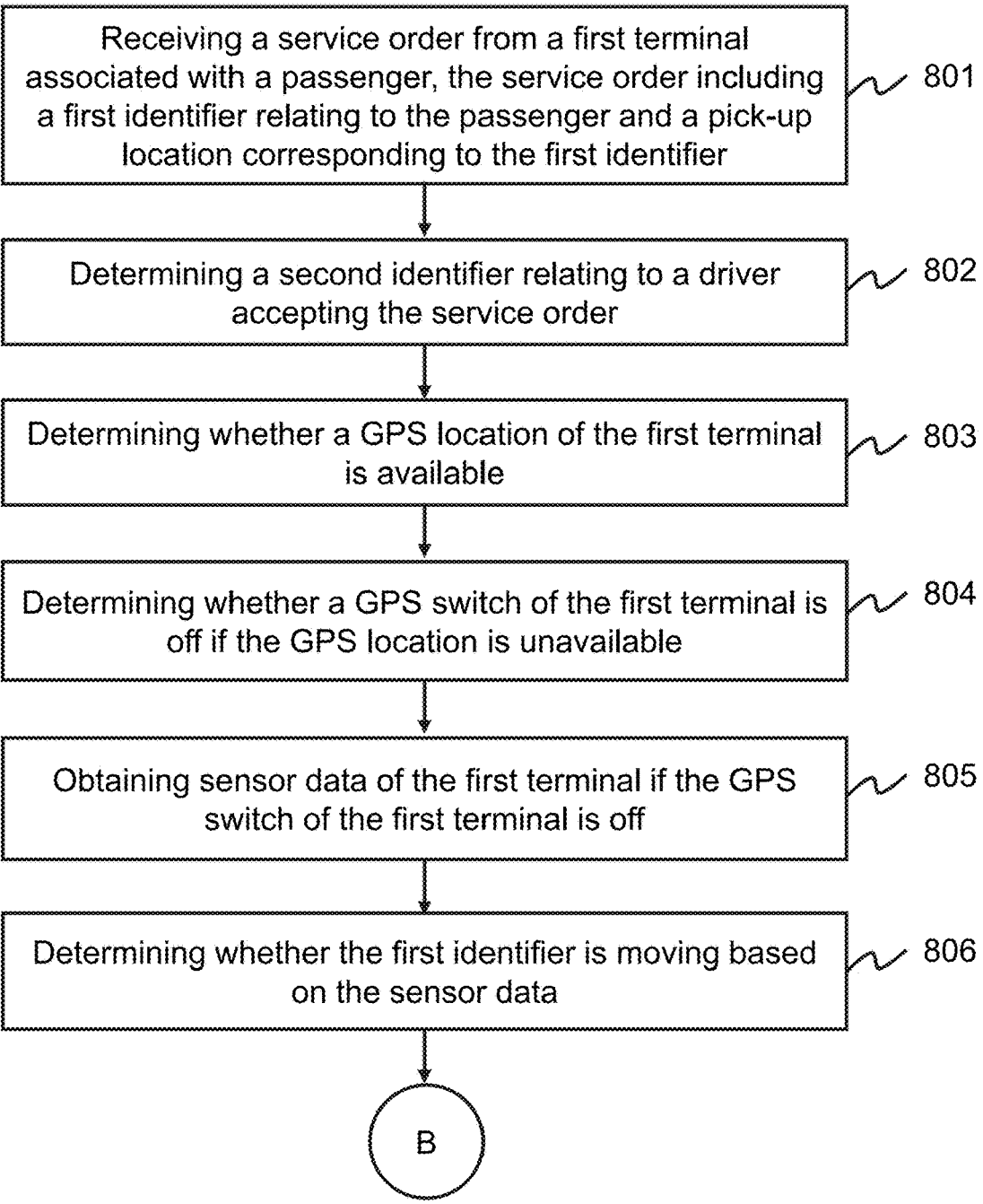
FIG. 8A and FIG. 8B are flowcharts of another exemplary process for processing status information according to some embodiments of the present disclosure.
Figure 8B:
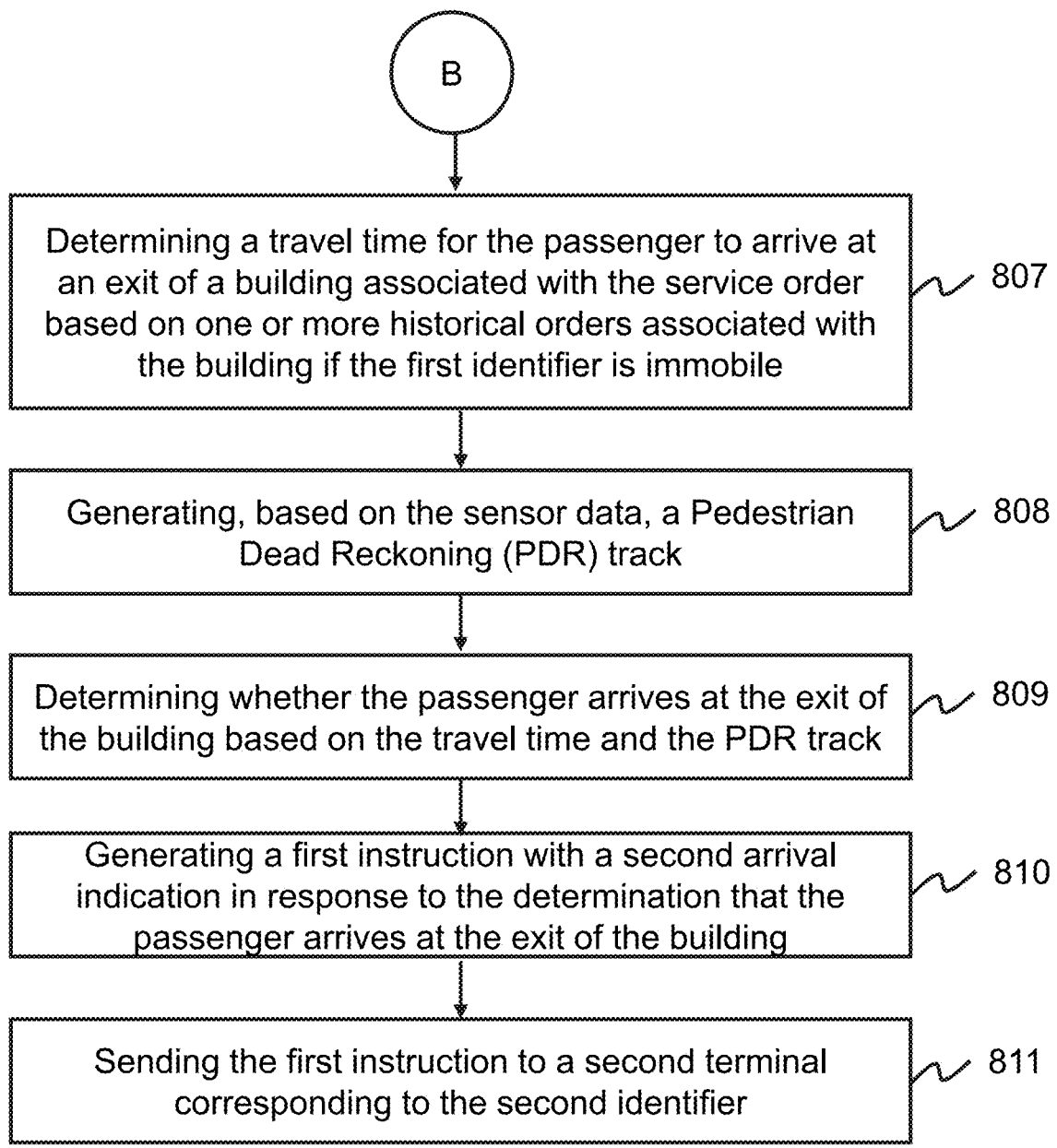

FIG. 8A and FIG. 8B are flowcharts of another exemplary process 800 for processing status information according to some embodiments of the present disclosure. In some embodiments, the process 800 for the status information may be implemented in the system 100 as illustrated in FIG. 1. For example, the process 800 may be implemented in a user terminal (e.g., the passenger terminal 130, driver terminal 140) and/or the server 110. The process 800 may also be implemented as one or more instructions stored in the storage 150 and called and/or executed by the processing engine 112.

In 801, the processing engine 112 may receive a service order from a first terminal associated with a passenger. The service order may include a first identifier corresponding to the passenger and a pick-up location designated by the passenger. More descriptions for receiving the service order may be in connection with step 510 as described in FIG. 5.

In 802, the processing engine 112 may determine a second identifier corresponding to a driver accepting the service order. More description for determining the second identifier corresponding to the driver accepting the service order may be in connection with step 520 as described in FIG. 5.

In 803, the processing engine 112 may determine whether a GPS location of the first terminal is available. More description for determining whether a GPS location of the first terminal is available may be in connection with step 730 as described in FIG. 7.

In 804, the processing engine 112 may determine whether a GPS switch of the first terminal is off if the GPS location is unavailable.

In 805, the processing engine 112 may obtain sensor data of the first terminal if the GPS switch of the first terminal is off. More descriptions for obtaining the sensor data of the first terminal may be found elsewhere in the present disclosure (e.g., FIGS. 6-7 and the descriptions thereof).

In 806, the processing engine 112 may determine whether the first identifier is moving based on the sensor data. More descriptions for determining whether the first identified is moving based on the sensor data may be found elsewhere in the present disclosure (e.g., FIGS. 6-7 and the descriptions thereof).

In 807, the processing engine 112 may determine a travel time for the passenger to arrive at an exit of a building associated with the service order based on one or more historical orders associated with the building if the first identifier is immobile. In some embodiments, if the processing engine 112 determines that the first identifier is immobile, the processing engine 112 may obtain the one or more historical orders associated with a building. The building may be associated a departure place included in the service order. For example, the departure place may correspond to the address of the building. As another example, the departure place may be in a certain distance from the building. In other words, the building may correspond to a current location of the passenger. The one or more historical orders may include departure places associated with the address of the building. In some embodiments, the historical orders may be generated by the passenger sending the service order and/or other one or more customers. The processing engine 112 may obtain the one or more historical orders from the first terminal, the storage 150, or other external storages.

In some embodiments, the processing engine 112 may determine the travel time for the passenger to arrive at the exit of the building based on the order request time and the passenger pick-up time for each of the historical orders. As used herein, the order request time associated with a historical order may refer to the time when the historical order is sent. The passenger pick-up time associated with a historical order may refer to the time when the passenger got on a vehicle associated with historical order. The processing engine 112 may determine differences between the request time and the passenger pick-up time for each of the historical orders as multiple estimated travel times. Further, the processing engine 112 may determine the travel time for the passenger to arrive at the exit of the building based on the estimated travel times. In some embodiments, the processing engine 112 may determine the maximum value of the multiple estimated travel time as the travel time for the passenger to arrive at the exit of the building. In some embodiments, the processing engine 112 may determine the average value of the multiple estimated travel time as the travel time for the passenger to arrive at the exit of the building.

In 808, the processing engine 112 may generate, based on the sensor data, a PDR track.

The processing engine 112 may generate the PDR track based on the sensor data using a PDR algorithm. Exemplary PDR algorithms may include an indoor PDR algorithm, or a PDR algorithm based on a Micro-Electro-Mechanical System (MEMS) sensor, etc.

It should be noted that it is also possible to obtain the sensor data before determining whether the GPS switch of the first terminal is on, and not intended to limit the scope of the present disclosure.

In 809, the processing engine 112 may determine whether the passenger arrives at the exit of the building based on the travel time and the PDR track. In some embodiments, the processing engine 112 may determine whether the passenger arrives at the exit of the building via comparing the travel time and the duration time of the PDR track. If the travel time is greater than or equal to the duration time of the PDR track, the processing engine 112 may determine that the passenger does not arrive at the exit of the building. If the travel time is smaller than the duration time of the PDR track, the processing engine 112 may determine that the passenger arrives at the exit of the building. In some embodiments, the processing engine 112 may determine whether the passenger arrives at the exit of the building via comparing the difference between the travel time and the duration time of the PDR track and a threshold. If the difference between the travel time and the duration time of the PDR track is less than the threshold, the processing engine 112 may determine that the passenger arrives at the exit of the building. For example, if the order request time that the passenger sent the service order is 17:30, the travel time for the passenger to arrive at the exit of the building is 10 minutes, and the duration time of the PDR track from 17:30 is 10 minutes, the processing engine 112 may determine that the passenger has arrived at the pick-up location. If the PDR track from 17:30 to 17:40 is basically absent, the processing engine 112 may determine that the passenger does not move or is indoors.

In 810, the processing engine 112 may generate the first instruction with a second arrival indication in response to the determination that the passenger arrives at the exit of the building. The second arrival indication may indicate that the passenger has arrived at the exit of the building.

In 811, the processing engine 112 may send the first instruction to a second terminal corresponding to the second identifier.

More description for sending the first instruction to the second terminal may be in connection with step 550 as described in FIG. 5.

After determining that the GPS switch of the first terminal associated with the first identifier and the passenger is immobile, the method for processing status information provided by this embodiment may determine whether the passenger arrives at the exit of the building associated with the service order based on the one or more historical orders associated with the building and the PDR track, thereby avoiding misjudging that the passenger does not depart because the GPS switch of the first terminal is off and providing the driver with more accurate status associated with passenger.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 804 and 805 may be exchanged. In some embodiments, operation 810 may be omitted from process 800 and process 800 may further include generating a first instruction in response to a determination that the passenger does not arrive at the exit of the building. The first instruction may include the passenger not departing, the travel time for the passenger arriving at the exit of the building, etc.

Figure 9:
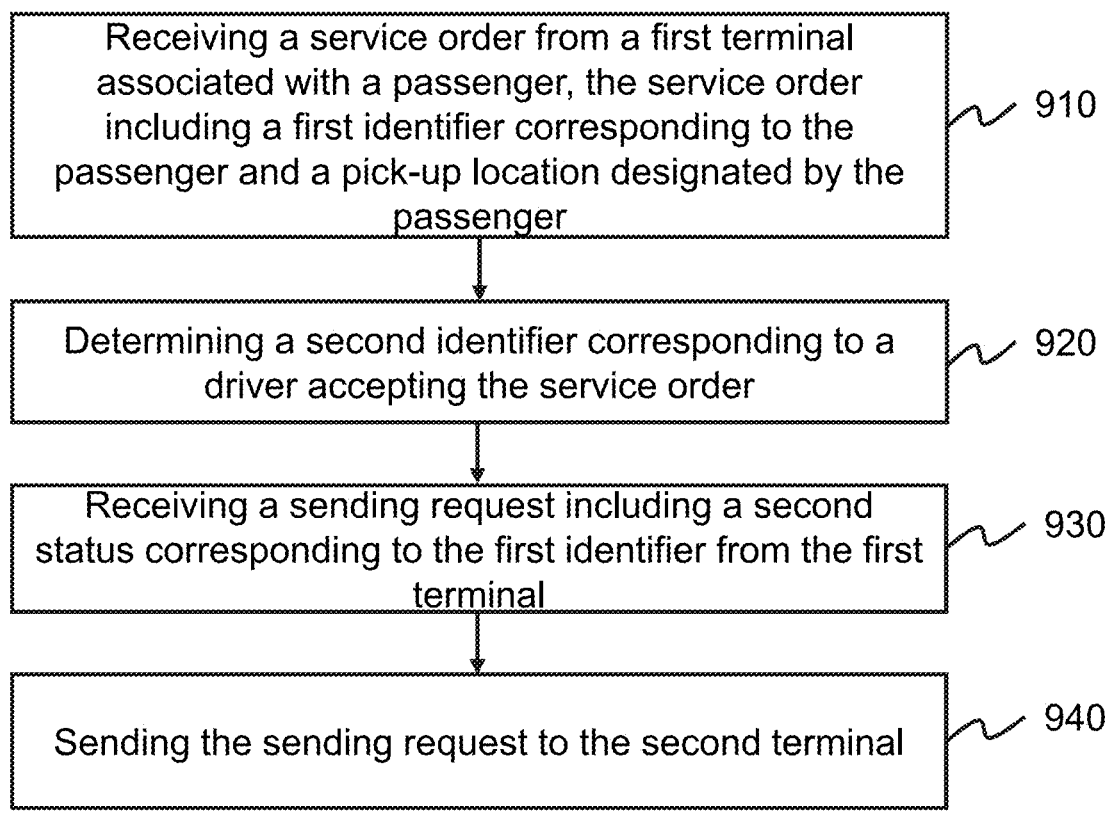
FIG. 9 is a flowchart of another exemplary process for processing status information according to some embodiments of the present disclosure.

FIG. 9 is a flowchart of another exemplary process 900 for processing status information according to some embodiments of the present disclosure. In some embodiments, the process 900 for the status information may be implemented in the system 100 as illustrated in FIG. 1. For example, the process 900 may be implemented in a user terminal (e.g., the passenger terminal 130, driver terminal 140) and/or the server 110. The process 900 may also be implemented as one or more instructions stored in the storage 150 and called and/or executed by the processing engine 112.

In 910, the processing engine 112 (e.g., the receiving module 410) may receive a service order from a first terminal associated with a passenger. The service order may include a first identifier corresponding to the passenger and a pick-up location designated by the passenger. More descriptions for receiving the service order may be in connection with step 510 as described in FIG. 5.

In 920, the processing engine 112 (e.g., the determining module 430) may determine a second identifier corresponding to a driver accepting the service order. More description for determining the second identifier corresponding to the driver accepting the service order may be in connection with step 520 as described in FIG. 5.

In 930, the processing engine 112 (e.g., the receiving module 410) may receive a sending request including second status corresponding to the first identifier from the first terminal. In some embodiments, the second status may be also referred to as a current status associated with the passenger. The second status may include at least one of clothing data corresponding to the first identifier, a location corresponding to the first identifier, first status corresponding to the first identifier as described elsewhere in the present disclosure, other information (e.g., a temporary condition causing the driver to wait a minute, the estimated travel time for the passenger to arrive the pick-up location, a change of the pick-up location, etc.) associated with the passenger, or the like, or any combination thereof.

In some embodiments, the second status may be inputted by the passenger manually via the first terminal. In some embodiments, the second status may be determined by the processing engine 112 automatically. For example, the processing engine 112 may determine the GPS location associated with the passenger based on GPS installed in the first terminal. As another example, the processing engine 112 may determine whether the passenger is moving based on data acquired by sensors installed in the first terminal. More descriptions for determining the second status (e.g., the first status) may be found elsewhere in the present disclosure (e.g., FIGS. 5-8 and the descriptions thereof.)

In 940, the processing engine 112 (e.g., the sending module 450) may send the sending request to the second terminal. The sending request may be sent to the second terminal in form of text, voice, video, etc. The driver may pick up the passenger based on the second status of the passenger included in the sending request. For example, the driver may find the passenger based on the passenger dress when the passenger arrives at the pick-up location. As another example, when the passenger does not depart, the driver may wait for a few minutes after knowing the second status sent by the passenger. As still another example, if the passenger wants to change the pick-up location, the driver may drive to the changed pick-up location based on the second status.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
at least one storage media storing a set of instructions for operating an online to offline service platform; and
at least one processor configured to communicate with the one or more storage media, wherein when executing the set of instructions, the at least one processor is directed to:
receive a service order, via the online to offline service platform implemented on a first terminal, from the first terminal associated with a service requester, the service order being initiated by the service requester through the online to offline service platform and including a first identifier corresponding to the service requester and a pick-up location designated by the service requester;
determine a second identifier corresponding to a service provider accepting the service order through the online to offline service platform implemented on a second terminal of the service provider;
obtain first status corresponding to the first identifier based on information acquired by sensors of the first terminal;
generate, based on the first status, a first instruction; and
send the first instruction, via the online to offline service platform implemented on the second terminal, to the second terminal associated with the second identifier,
wherein to obtain the first status based on information acquired by sensors of the first terminal, the at least one processor is further directed to:

determine whether a GPS location of the first terminal is unavailable, the GPS location being acquired by a GPS receiver installed in the first terminal; and in response to a determination that the GPS location of the first terminal is unavailable, obtain, through the online to offline service platform, sensor data of the first terminal, and determine the first status based on the sensor data, the first status including whether the first terminal is moving.

2. The system of claim 1, wherein to obtain the first status based on information acquired by sensors of the first terminal, the at least one processor is further directed to:

in response to a determination that the GPS location of the first terminal is available, obtain a GPS location of the first terminal; and determine, based on the GPS location of the first terminal, the first status.

3. The system of claim 2, wherein the at least one processor is further directed to:

in response to a determination that the GPS location shows the first terminal arrives at the pick-up location, generate the first instruction with a first arrival indication.

4. The system of claim 2, wherein the at least one processor is further directed to:

in response to a determination that the GPS location shows the first terminal does not arrive at the pick-up location, generate the first instruction including a distance between the GPS location of the first terminal and the pick-up location.

5. The system of claim 1, wherein the at least one processor is further directed to:

in response to a determination that the first terminal is immobile, determine whether a GPS switch is turned on; and
generate the first instruction indicating that the service requester does not depart in response a determination that the GPS switch is turned on.

6. The system of claim 1, wherein the at least one processor is further directed to:

determine whether a GPS switch is turned on;
in response a determination that the GPS switch is turned off, determine a travel time for the service requester to arrive at an exit of a building associated with the service order based on one or more historical orders associated with the building; and generate, based on the sensor data, a Pedestrian Dead Reckoning (PDR) track.

7. The system 6, wherein the at least one processor is further directed to:

determine whether the service requester arrives at the exit of the building based on the travel time and the PDR track; and generate the first instruction with a second arrival indication in response to the determining that the service requester arrives at the exit of the building.

8. The system of claim 6, wherein the one or more historical orders are associated with a plurality of customers.

9. The system of claim 1, wherein the at least one processor is further directed to:

receive a sending request from the first terminal, the sending request including a second status associated with the service requester, and the second status including at least one of clothing data corresponding to the first identifier, a location corresponding to the first identifier, or the first status corresponding to the first identifier; and send the sending request to the second terminal.

10. The system of claim 1, wherein:

the first status further includes a location status corresponding to the first identifier, wherein the location status including a distance between a current location of the service requester and the pick-up location, whether the passenger arrives at the pick-up location, whether the service requester is indoors, or whether the service requester arrives at an exit of a building; and the first instruction indicates a real-time status of the service requester and includes an arrival indication, a non-arrival indication, or a distance between the current location of the service requester and the pick-up location.

11. A method implemented on at least one device each of which has at least one processor, a storage, and a communication platform to connect to a network, the method comprising:

receiving a service order, via an online to offline service platform implemented on a first terminal, from the first terminal associated with a service requester, the service order being initiated by the service requester through the online to offline service platform and including a first identifier corresponding to the service requester and a pick-up location designated by the service requester;

determining a second identifier corresponding to a service provider accepting the service order through the online to offline service platform implemented on a second terminal of the service provider;

obtaining first status corresponding to the first identifier based on information acquired by sensors of the first terminal;

generating, based on the first status, a first instruction; and sending the first instruction, via the online to offline service platform implemented on the second terminal, to the second terminal associated with the second identifier, wherein the obtaining the first status based on information acquired by sensors of the first terminal comprises:

determining whether a GPS location of the first terminal is unavailable, the GPS location being acquired by a GPS receiver installed in the first terminal; and in response to a determination that the GPS location of the first terminal is unavailable, obtaining, through the online to offline service platform, sensor data of the first terminal, and determining the first status based on the sensor data, the first status including whether the first terminal is moving.

12. The method of claim 11, wherein the obtaining the first status corresponding to the first identifier comprises:

in response to a determination that the GPS location of the first terminal is available, obtaining a GPS location of the first terminal based on information acquired by sensors of the first terminal; and determining, based on the GPS location of the first terminal, the first status.

13. The method of claim 12, wherein the method further comprises:

in response to a determination that the GPS location shows the first terminal arrives at the pick-up location, generating the first instruction with a first arrival indication; or in response to a determination that the GPS location shows the first terminal does not arrive at the pick-up location, generating the first instruction including a distance between the GPS location of the first terminal and the pick-up location.

14. The method of claim 11, wherein the method further comprises:
in response to a determination that the first terminal is immobile, determining whether a GPS switch is turned on; and
generating the first instruction indicating that the service requester does not depart in response a determination that the GPS switch is turned on.

15. The method of claim 11, further comprising:
determining whether a GPS switch is turned on;
in response a determination that the GPS switch is turned off, determining a travel time for the service requester to arrive at an exit of a building associated with the service order based on one or more historical orders associated with the building; and
generating, based on the sensor data, a Pedestrian Dead Reckoning (PDR) track.

16. The method of claim 15, further comprising:
determining whether the service requester arrives at the exit of the building based on the travel time and the PDR track; and
generating the first instruction with a second arrival indication in response to the determining that the service requester arrives at the exit of the building.

17. The method of claim 15, wherein the one or more historical orders are associated with a plurality of customers.

18. The method of claim 11, further comprising:
receiving a sending request from the first terminal, the sending request including a second status associated with the service requester, and the second status including at least one of clothing data corresponding to the first identifier, a location corresponding to the first identifier, and the first status corresponding to the first identifier; and
sending the sending request to the second terminal.

19. The method of claim 11, wherein:
the first status further includes a location status corresponding to the first identifier, wherein the location status including a distance between a current location of the service requester and the pick-up location, whether the passenger arrives at the pick-up location, whether the service requester is indoors, or whether the service requester arrives at an exit of a building; and
the first instruction indicates a real-time status of the service requester and includes an arrival indication, a non-arrival indication, or a distance between the current location of the service requester and the pick-up location.

20. A non-transitory computer readable medium, comprising at least one set of instructions for providing an online to offline service, wherein when executed by a processor, the at least one set of instructions directs the processor to perform acts of:
receiving a service order, via an online to offline service platform implemented on a first terminal, from the first terminal associated with a service requester, the service order being initiated by the service requester through the online to offline service platform and including a first identifier corresponding to the service requester and a pick-up location designated by the service requester;
determining a second identifier corresponding to a service provider accepting the service order through the online to offline service platform implemented on a second terminal of the service provider;
obtaining first status corresponding to the first identifier based on information acquired by sensors of the first terminal;
generating, based on the first status, a first instruction; and
sending the first instruction, via the online to offline service platform implemented on the second terminal, to the second terminal associated with the second identifier,
wherein the obtaining the first status based on information acquired by sensors of the first terminal comprises:
determining whether a GPS location of the first terminal is unavailable, the GPS location being acquired by a GPS receiver installed in the first terminal; and
in response to a determination that the GPS location of the first terminal is unavailable, obtaining, through the online to offline service platform, sensor data of the first terminal, and determining the first status based on the sensor data, the first status including whether the first terminal is moving.

* * * * *